(12) United States Patent
Wetsel et al.

(10) Patent No.: US 12,189,753 B2
(45) Date of Patent: Jan. 7, 2025

(54) PERMITTING DEVICE USE BASED ON LOCATION RECOGNIZED FROM CAMERA INPUT

(71) Applicant: Lenovo (Singapore) Pte. Ltd., Singapore (SG)

(72) Inventors: Peter Hamilton Wetsel, Apex, NC (US); David Rivera, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 407 days.

(21) Appl. No.: 17/063,220

(22) Filed: Oct. 5, 2020

(65) Prior Publication Data
US 2022/0108000 A1    Apr. 7, 2022

(51) Int. Cl.
| | | |
|---|---|---|
| G06F 21/00 | (2013.01) | |
| G06F 18/22 | (2023.01) | |
| G06F 21/44 | (2013.01) | |
| G06V 20/00 | (2022.01) | |
| H04W 88/02 | (2009.01) | |

(52) U.S. Cl.
CPC .............. *G06F 21/44* (2013.01); *G06F 18/22* (2023.01); *G06V 20/00* (2022.01); *H04W 88/02* (2013.01)

(58) Field of Classification Search
CPC ....... G06F 21/44; G06F 18/22; G06K 9/6201; G06V 20/00; H04W 88/02
See application file for complete search history.

(56) References Cited

U.S. PATENT DOCUMENTS

| | | | | |
|---|---|---|---|---|
| 9,231,825 | B2* | 1/2016 | Sakamaki | H04L 41/0853 |
| 10,929,098 | B2* | 2/2021 | Sarir | G06F 3/04817 |
| 2013/0137462 | A1* | 5/2013 | Van Os | H04L 67/52 |
| | | | | 455/456.3 |
| 2013/0237207 | A1* | 9/2013 | Howarter | H04M 1/72463 |
| | | | | 455/418 |
| 2014/0349747 | A1* | 11/2014 | Leyvand | G06F 21/32 |
| | | | | 463/29 |
| 2015/0106900 | A1* | 4/2015 | Pinski | H04W 12/068 |
| | | | | 726/7 |
| 2015/0358769 | A1* | 12/2015 | Cudak | H04W 12/30 |
| | | | | 455/456.4 |
| 2016/0275352 | A1* | 9/2016 | Rajappa | G06V 10/751 |
| 2017/0193686 | A1* | 7/2017 | Mullins | G06F 3/005 |
| 2018/0075168 | A1* | 3/2018 | Tiwari | H04N 23/698 |
| 2018/0121643 | A1* | 5/2018 | Talwerdi | G06F 21/32 |
| 2019/0132815 | A1* | 5/2019 | Zampini, II | G06Q 50/06 |
| 2019/0156582 | A1* | 5/2019 | Yankovich | G06Q 10/087 |
| 2019/0302445 | A1* | 10/2019 | Cho | G02B 5/005 |
| 2019/0342438 | A1* | 11/2019 | Liu | G06F 21/31 |
| 2020/0379593 | A1* | 12/2020 | de Vries | G06F 3/04883 |
| 2020/0387709 | A1* | 12/2020 | Baykaner | G06F 21/31 |
| 2020/0394012 | A1* | 12/2020 | Wright, Jr. | G06K 9/6201 |
| 2021/0144393 | A1* | 5/2021 | Toda | H04N 21/2405 |

(Continued)

*Primary Examiner* — Rodman Alexander Mahmoudi
(74) *Attorney, Agent, or Firm* — John M. Rogitz; John L. Rogitz (57) ABSTRACT

In one aspect, a device may include at least one processor, a camera accessible to the at least one processor, and storage accessible to the at least one processor. The storage may include instructions executable by the at least one processor to receive input from the camera and to, based on the input, recognize a particular location. The instructions may also be executable to, based on the recognition of the particular location, permit use of a device.

17 Claims, 7 Drawing Sheets

(56) References Cited

U.S. PATENT DOCUMENTS

2021/0207974 A1\* 7/2021 Zhou .................... G06V 20/647
2022/0060622 A1\* 2/2022 Brändli ................... G06F 1/163
2023/0222744 A1\* 7/2023 Uhm ......................... G06F 3/01
　　　　　　　　　　　　　　　　　　　　　345/633

\* cited by examiner

PERMITTING DEVICE USE BASED ON LOCATION RECOGNIZED FROM CAMERA INPUT

FIELD

The present application relates to technically inventive, non-routine solutions that are necessarily rooted in computer technology and that produce concrete technical improvements.

BACKGROUND

As recognized herein, there may be instances where organizations or individual users might want to secure augmented reality (AR) devices. However, as also recognized herein, current authentication techniques alone might not be secure enough and may not even be possible since many AR devices do not have typical input/output devices like a keyboard physically attached to them. Geofencing also might not be an adequate option as some AR devices do not have GPS capability. There are currently no adequate solutions to the foregoing computer-related, technological problem.

SUMMARY

Accordingly, in one aspect a device includes at least one processor, a camera accessible to the at least one processor, and storage accessible to the at least one processor. The storage includes instructions executable by the at least one processor to receive input from the camera and, based on the input, recognize one or more aspects related to a geographic location. The instructions are also executable to permit use of the device based on the recognition of the one or more aspects related to the geographic location.

Thus, in some examples the device may include an augmented reality (AR) headset and the device may be configured for use in recognized geographic locations and for refusing use in non-recognized geographic locations. This may include, for example, the instructions being executable to authenticate the geographic location based on the recognition of the one or more aspects and to permit use of the device based on the authentication of the geographic location. This may also include, for example, the instructions being executable to permit use of the device at least in part by logging a user in to the device in a recognized geographic location.

In some example implementations, the recognition of the one or more aspects related to the geographic location may be used as one factor as part of two-factor authentication executed by the device to permit use of the device.

Also in some example implementations, the one or more aspects that are recognized may include one or more registered geometric shapes that have already been associated with the geographic location.

Additionally or alternatively, the one or more aspects that are recognized may include one or more registered objects associated with the geographic location. So, for example, the one or more registered objects may have been registered during a location registration process and prior to receipt of the input from the camera. Registration data for the one or more registered objects that may be generated during the location registration process may even be stored locally at the device prior to receipt of the input from the camera so that the one or more registered objects may be recognizable as matching the registration data based on the input from the camera while the device does not have a network connection.

In some example implementations, the geographic location may include a particular room of a building that may have been registered for allowing device use while the device is in the particular room. The particular room may have been registered prior to receipt of the input from the camera.

In another aspect, a method includes receiving, at a device, input from a camera. The method also includes, based on the input, using the device to recognize one or more elements related to a particular location. The method further includes permitting use of the device based on the recognition of the one or more elements related to the particular location.

In some examples, the device may include an augmented reality headset.

Further, in some example implementations, the method may include receiving user input of a password or personal identification number (PIN). The method may then include authenticating a user based on receipt of the password or PIN, and then permitting use of the device based on the authenticating of the user and based on the recognition of the one or more elements related to the particular location.

Also in some example implementations, the method may include receiving biometric input from a user. In these implementations, the method may then include authenticating the user based on receipt of the biometric input, and then permitting use of the device based on the authenticating of the user and based on the recognition of the one or more elements related to the particular location.

Still further, in some example implementations the method may include, based on the input, using the device to recognize at least two different objects at the particular location as already being recognized by the device in a previous instance. In these implementations the method may then include permitting use of the device based on the recognition of the at least two different objects at the particular location as already being recognized by the device in the previous instance. The previous instance may have occurred during a registration process to register the device for permitting device use while the device is, in the future, at the particular location.

In still another aspect, an apparatus includes at least one computer readable storage medium (CRSM) that is not a transitory signal. The computer readable storage medium includes instructions executable by at least one processor to receive input from a camera and, based on the input, recognize a particular location. The instructions are also executable to permit use of a device based on the recognition of the particular location.

So, for example, in some implementations the apparatus may include the device and the device may be a device that presents augmented reality images. The device may be configured for use in recognized locations and for refusing use in non-recognized locations. Also, in some examples the device may be a smartphone or other mobile device.

The details of present principles, both as to their structure and operation, can best be understood in reference to the accompanying drawings, in which like reference numerals refer to like parts, and in which:

DETAILED DESCRIPTION

The present application is directed to, among other things, AR devices that may be equipped with one or several cameras that can be used to map a room and/or its physical surroundings. The cameras can be used to identify the shapes of objects in the area and the overall area geometry. This can act as a "fingerprint" of the area that the AR device can read and use at a later time to recognize the area and thus authenticate the area as being approved for device use. In some examples, a user may also be asked to provide user-specific authentication credentials as well for additional security, such as a PIN or password. Thus, the user may be authenticated while the area itself may also be authenticated using the area "fingerprint" to ensure the device is being used by an authorized user at an expected/authorized location. If the location of the device cannot be not confirmed as an authorized location, device use and/or logon to the device can be denied.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
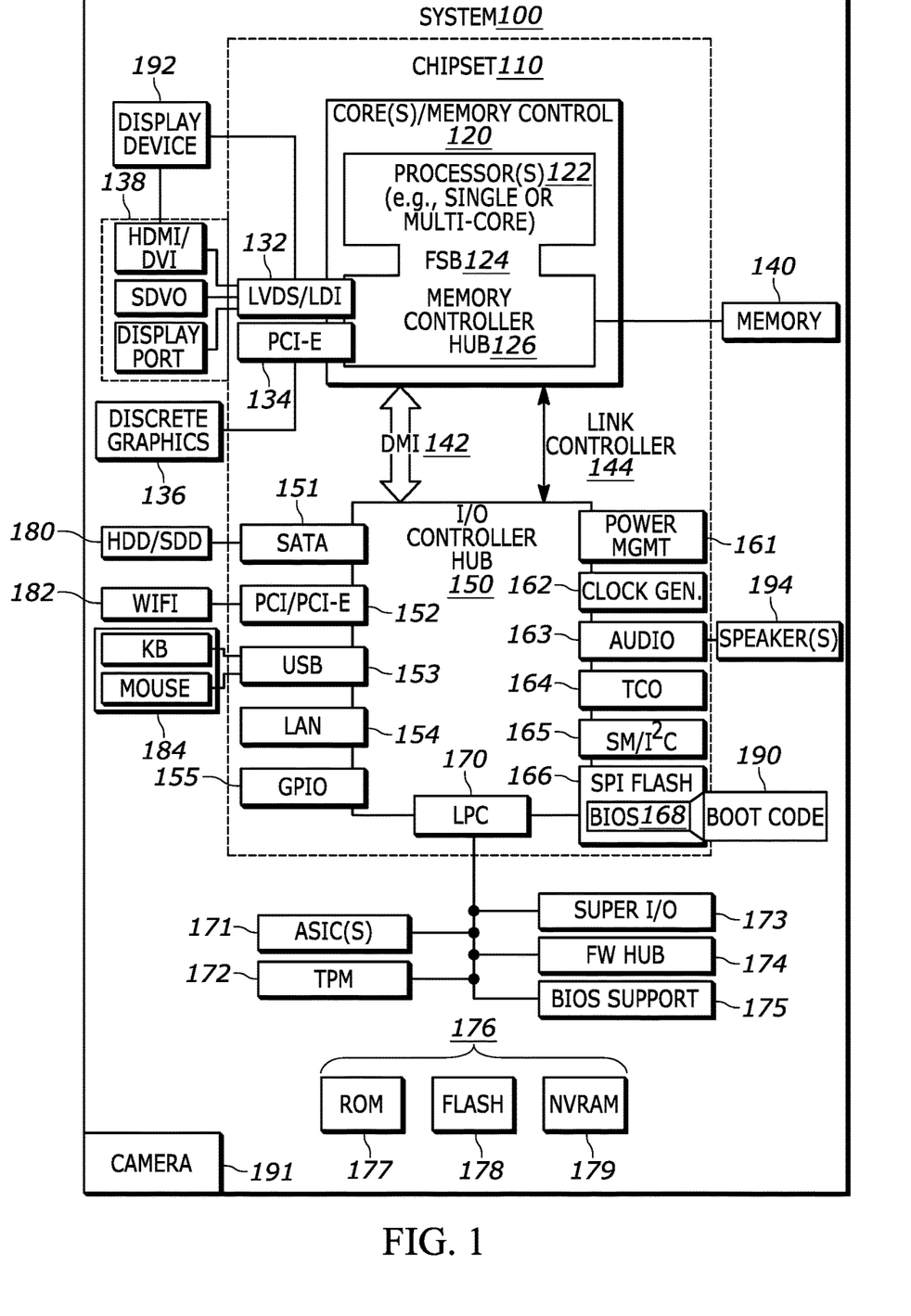
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, as shown in FIG. 1 the system 100 may also include one or more cameras 191 that gather one or more images and provides images and related input to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
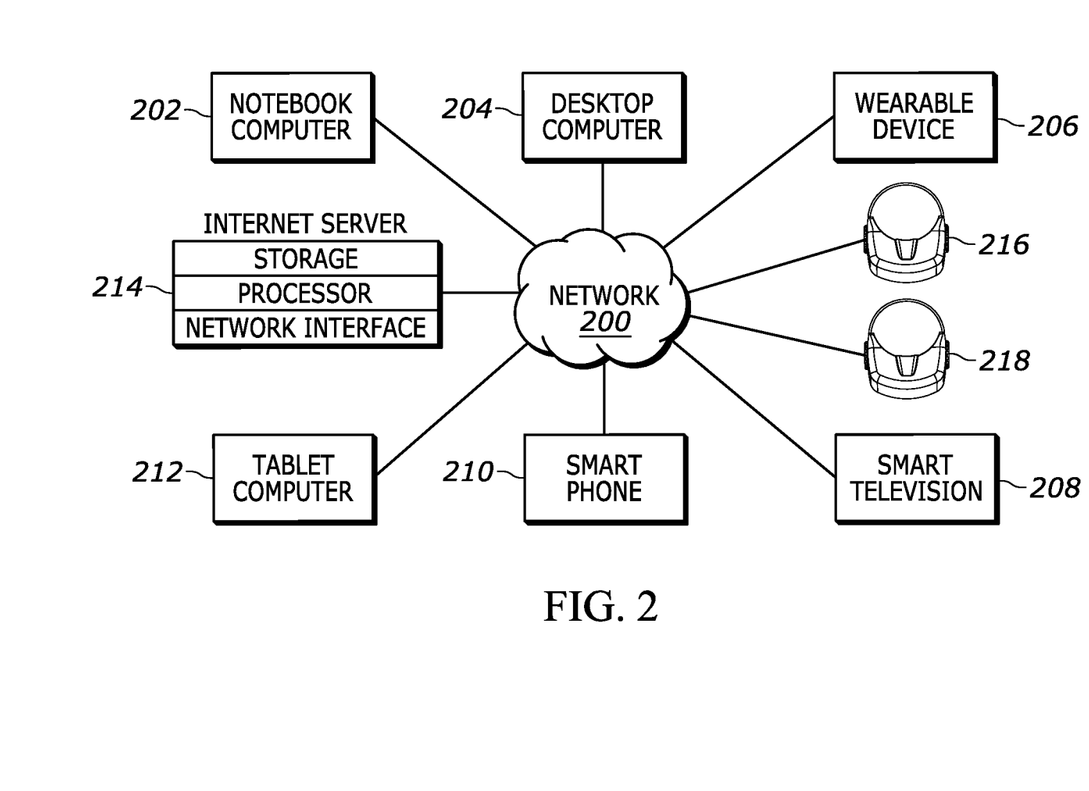
FIG. 2 is a block diagram of an example network of devices consistent with present principles.

Turning now to FIG. 2, example devices are shown communicating over a network 200 such as the Internet or a local area network (LAN) in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, headsets 216 and 218, and a server 214 such as an Internet server that may provide cloud storage accessible to the devices 202-212, 216, 218. It is to be understood that the devices 202-218 are configured to communicate with each other over the network 200 to undertake present principles.

Figure 3:
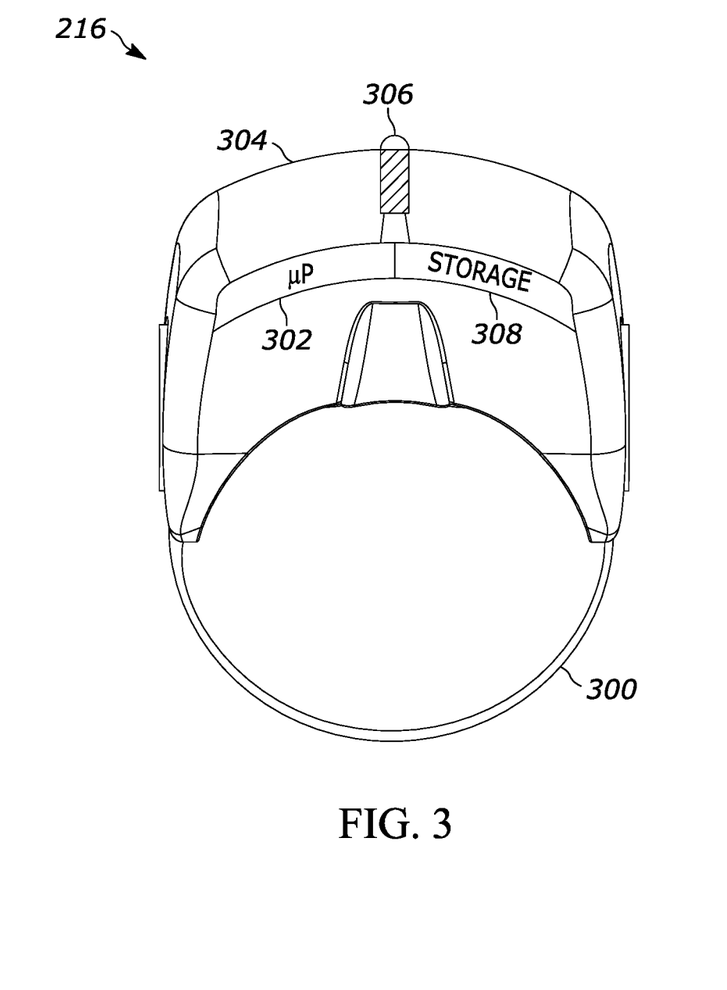
FIG. 3 is a block diagram of an example augmented reality (AR) device consistent with present principles.

Now describing FIG. 3, it shows a top plan view of an augmented reality (AR) headset, such as the headset 216, consistent with present principles. The headset 216 may include a housing 300, at least one processor 302 in the housing 300, and a transparent "heads up" display 304 accessible to the at least one processor 302 and coupled to the housing 300. The display 304 may for example have discrete left and right eye pieces as shown for presentation of stereoscopic and/or augmented reality images/objects consistent with present principles.

The headset 216 may also include one or more forward-facing cameras 306. As shown, the camera 306 may be mounted on a bridge portion of the display 304 so that it may have an outward-facing field of view similar to that of a user wearing the headset 216. However, the camera(s) 306 may be located at other headset locations as well.

The camera(s) 306 may be used for, among other things, object recognition, computer vision, image registration, spatial mapping, and/or simultaneous localization and mapping (SLAM) for recognition of objects and/or locations as well as presentation of AR content consistent with present principles. Further note that in some examples inward-facing cameras may also be mounted within the headset 216 and oriented to image the user's eyes for eye tracking and/or for iris recognition as a form of biometric identification consistent with present principles.

Additionally, the headset 316 may include storage 308 accessible to the processor 302 and coupled to the housing 300, as well as still other components not shown for simplicity such as a network interface for communicating over a network such as the Internet and a battery for powering components of the headset 216 such as the camera(s) 306. Additionally, note that while the headset 216 is illustrated as a head-circumscribing augmented reality (AR) headset, it may also be established by computerized smart glasses or another type of AR headset.

For example, the headset may be established by a virtual reality (VR) headset that may not have a transparent display but may still be able to present virtual AR objects/content on its display along with a real-world, real-time camera feed of an environment imaged by the front-facing camera(s) 306 to provide an AR experience to the user. This AR technique might similarly apply to other mobile devices with non-transparent displays that still have AR capabilities, such as smartphones.

Figure 4:
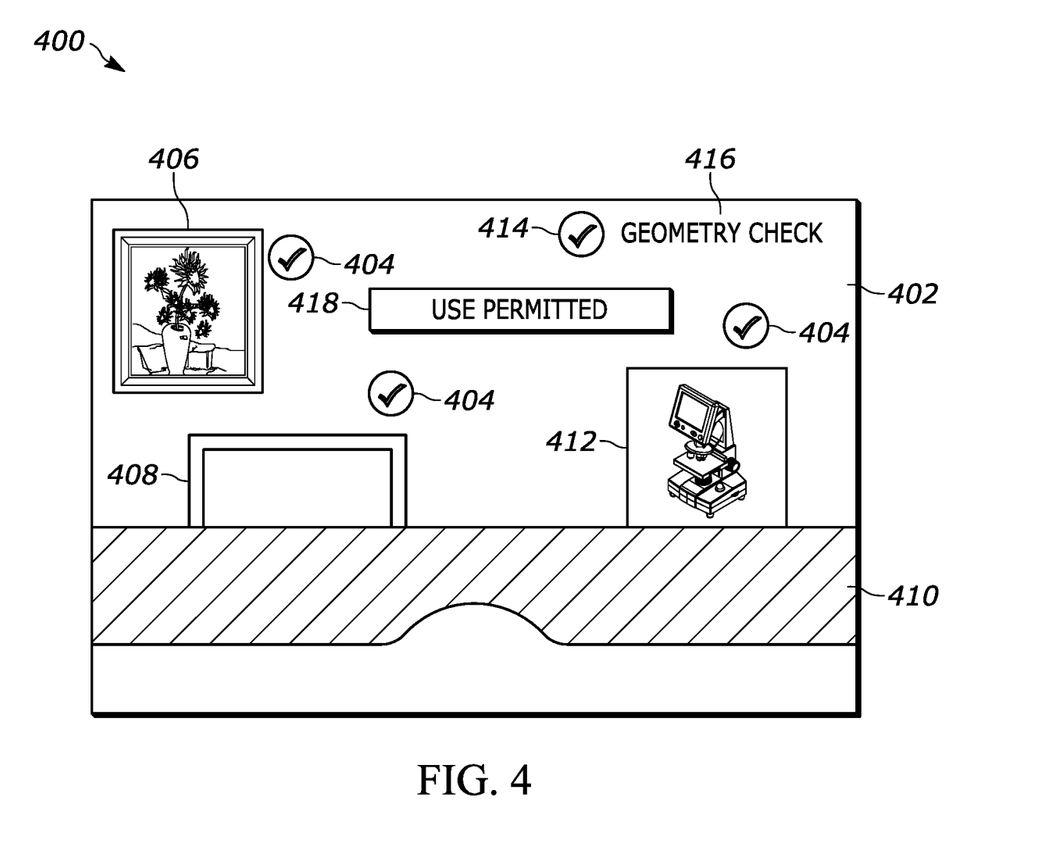
FIG. 4 shows an example perspective of a user while wearing an AR headset and looking through its display to view the user's real-world geographic location consistent with present principles.

Referring now to FIG. 4, it shows an example perspective 400 of a user while wearing an AR headset and looking through its display to view the user's real-world geographic location 402. In this case, the location 402 is a room of a particular building but it may also be an outside area, a vehicle, etc.

Consistent with present principles, the AR headset may use input from its forward-facing camera (e.g., still images or video) to identify the at least somewhat unique geometry of the room and/or to identify one or more objects within the room. With the display of the AR headset being left blank or in fully transmissive form (presenting no images or data), the AR headset may then compare geometric dimensions and/or particular objects that are recognized from the input to prestored data generated during a location registration process to determine whether the dimensions and/or one or more of the objects as shown in the input match reference dimensions or objects indicated in the prestored data. If one or more matches are returned, the AR headset may permit its use by the user wearing it, such as to present AR images, to track the user's surroundings as the user moves, to recognize gestures made by the user using his or her arm, to execute eye tracking to track the user's eyes, to execute one or more software applications other than an operating system at the AR headset, to execute the AR headset's operating system itself, etc.

Thus, as shown in FIG. 4, once use is permitted an AR object or other graphical object 404 such as a circle with an inner checkmark may be overlaid on the user's field of view next to each matched real-world object using the display of the AR headset. The graphical object 404 for each matched item may be presented using AR processing (e.g., using stereoscopic images) to appear as though located within a threshold X-Y distance of the respective real-world object itself (e.g., within one foot) and to also appear as though located at the same depth relative to the AR headset as the real-world object itself (in the Z dimension). Each graphical object 404 may therefore indicate to the user a real-world object shown in the images from the camera as being matched to a reference object indicated in the prestored data.

Further, in some examples no graphical object may be presented next to real-world objects that have not been matched, while in other examples a red circle with a red "X" within may be presented next to those real-world objects.

In the example shown in FIG. 4, a respective green check mark object 404 is presented next to a unique portrait or painting 406 hanging on a wall of the room, a desk 408 sitting on the floor 410 of the room, and lab equipment 412 such as a spectrometer or microscope.

As also shown in FIG. 4, another green check mark graphical object 414 may be presented next to a graphical indication 416 presented on the display that indicates that the geometry of the room has been authenticated against the prestored data as well. An overall result graphical indication 418 may also be presented that indicates that device use has therefore been permitted.

Thus, once the room, including its geometry and/or one or more objects therein, have been authenticated to a threshold level of confidence, the AR headset may first present the objects 404, 414 and graphical indications 416, 418 to indicate that AR headset use has been permitted. The AR headset may then actually permit its use for other purposes such as those described above. The threshold level of confidence may be set by, for example, a system administrator or the manufacturer of the AR headset.

Additionally, note that since individual objects within the room might have been moved around the room and/or be seen by the AR headset from a different angle or perspective than during location registration, fuzzy logic may be executed in determining whether an object shown in an image from the camera matches a reference object indicated in the prestored data even if not shown at an expected location or if not shown from an expected perspective.

Also note that every single object recognized during the location registration process need not be recognized later outside of the registration process since some objects might have been removed from the room. However, the AR headset may still require, for example, two or more objects to be recognized or for a specific object to be recognized as specified by the end-user to further enhance security.

Figure 5:
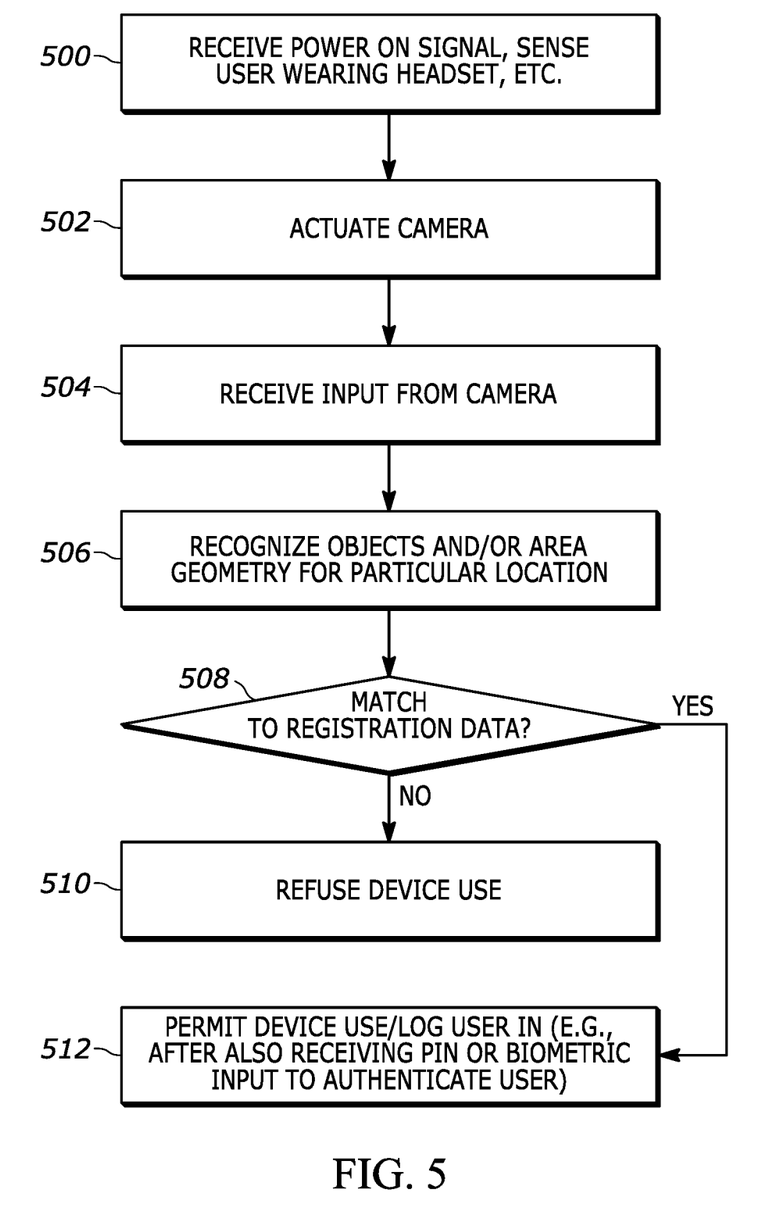
FIG. 5 is a flow chart of an example algorithm that may be executed to recognize/authenticate a location consistent with present principles.

Referring now to FIG. 5, it shows example logic that may be executed by a device such as the system 100 and/or AR headset of FIG. 4 consistent with present principles in order to authenticate or validate a particular location as a location at which device use should be permitted. Beginning at block 500, the device may receive a power on signal that may be generated responsive to the user pressing a power button on the device and then use that signal as a trigger for ensuing logic. Additionally or alternatively, the trigger may be established by the device sensing the user wearing or putting the device on (e.g., based on input from a proximity sensor or motion sensor on the device indicating user proximity or movement of the device, respectively). The user providing user-specific input to authenticate the user himself or herself may also be used as the trigger, such as the user providing fingerprint input to a fingerprint reader on the device or the user speaking a password or PIN (as detected using a microphone on the device and execution of voice recognition) to log the user in to the device. Facial recognition may also be used where the device of FIG. 5 images the user's face with one of its cameras, e.g., as the user puts on the AR headset.

Responsive to the one or more triggers, the logic of FIG. 5 may then proceed to block 502 where the device may turn on or otherwise actuate its camera to generate one or more images according to the camera's field of view. Then at block 504 the device may receive the image(s) from the camera and, at block 506, execute object recognition to recognize one or more individual real-world objects shown in the image(s).

Additionally or alternatively, at block 506 the device may execute computer vision, spatial mapping, and/or simultaneous localization and mapping (SLAM). These algorithms may be executed in order to identify the geometry of the location in which the device is disposed, such as the shape/dimensions of a room including the height and width of walls and the width and length of floors. The geometry of certain objects may also be identified using these algorithms, such as the geometry of a large object that cannot be identified using object recognition or even one that can (e.g., an oversized desk).

From block 506 the logic may proceed to decision diamond 508. At diamond 508 the device may compare the results of the object recognition and/or geometrical analysis from block 506 to prestored data indicating registered objects and/or geographical dimensions as recognized by the device in a previous instance during a registration process for registering the location. Responsive to the recognition result(s) from block 506 not matching the registration data to a threshold level of confidence (e.g., the current location of the device is not recognized), the logic may proceed to block 510 where the device may deny or refuse its use at the current location. For example, at block 510 the device may present a prompt on its display indicating that use at the current location has been refused. Also at block, 510 the device may then shut down, go into a sleep or hibernate mode, lockout all people from using the device for a threshold period of time (e.g., fifteen minutes), visually or audibly prompt the user to move to a different location that may be recognized as already registered, instruct the user to move to a different part of the current location for the device to attempt location authentication again, etc.

However, responsive to the recognition result(s) from block 506 matching the registration data at least to the threshold level of confidence, the logic may instead proceed to block 512. At block 512 the device may simply permit device use.

Or, in some examples at block 512 prior to permitting device use the device may perform a second level of authentication such as using its GPS transceiver as an additional form of location confirmation to provide even more security. The second level of authentication may also include performing user-specific authentication as described herein to provide even more security in that only previously-authorized users may be permitted to use the device at the authenticated location. So, for example, the user may be authenticated based on the user providing a personal identification number (PIN) or password, based on the user providing biometric input such as fingerprint input for fingerprint matching or voice input for voice matching, and/or based on an inward-facing camera within the device identifying the user based on iris recognition. Then once the second authentication has been performed the device may permit device use and/or log the user into the device at block 512.

Figure 6:
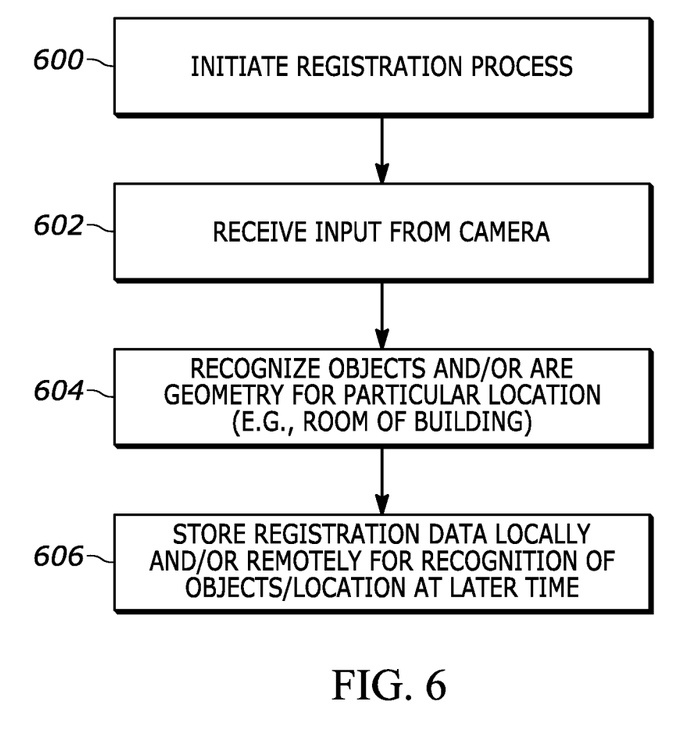
FIG. 6 is a flow chart of an example algorithm that may be executed to register a location for recognition/authentication at a later time consistent with present principles.

Continuing the detailed description in reference to FIG. 6, it shows example logic that may be executed by a device such as the system 100 and/or AR headset consistent with present principles during a location registration process as described herein. The logic of FIG. 6 may be triggered responsive to user command, responsive to the device being powered on for the first time after purchase from a retailer or manufacturer, based on command from a system administrator, etc. Thus, at block 600 the registration process may be initiated based on the trigger and then proceed to block 602. At block 602 the device may prompt the user to take one or more actions to show different items or portions of a current location to a camera on the device so that, also at block 602, the device may receive input from the camera. An example of such a prompt will be described below in reference to FIG. 7.

But still in reference to FIG. 6, from block 602 the logic may then proceed to block 604. At block 604 the device may execute object recognition to recognize one or more individual real-world objects shown in the input received at block 602. Additionally or alternatively, at block 604 the device may execute computer vision, spatial mapping, and/or SLAM in order to identify the geometry of the location in which the device is disposed (e.g., shape and size of a room). The geometry of certain objects may also be identified, such as the geometry of a large object that cannot be identified using object recognition or even one that can.

From block 604 the logic may proceed to block 606 where the device may store the recognition results as registration data for future use, e.g., in conformance with the description of FIG. 5. The registration data may be stored locally at the device itself (e.g., AR headset) and/or may be stored remotely in cloud storage or at another networked device. The registration data may then be used at a later time, such as when the device executes the logic of FIG. 5 to determine whether to permit device use.

Figure 7:
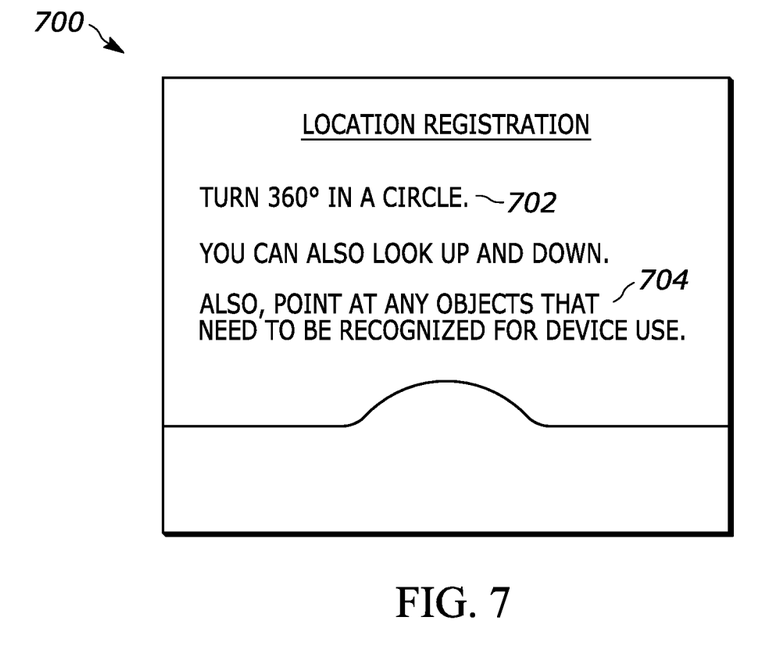
FIGS. 7 and 8 show example prompts that may be presented on a display during a location registration process consistent with present principles.

Now in reference to FIG. 7, it shows a prompt 700 that may be presented on the display of a device operating consistent with present principles to, during a location registration process, instruct an end-user to take one or more actions in order for the device to register the current location of the device as a location for which device use should be permitted. So, for example, the prompt 700 may be presented on the transparent display of an AR headset or the display of a smartphone that might be configured to execute the logic of FIGS. 5 and 6.

As shown in FIG. 7, the prompt 700 may include instructions 702 for the user to, while standing, turn three hundred and sixty degrees in a circle so that the device can map the area and/or recognize individual objects. In some examples, the instructions 702 may even instruct the user to look up and down at certain points during the circular rotation to get an even more complete "fingerprint" of the room.

Still further, in some examples the prompt 700 may include instructions 704. The instructions 704 may indicate that the user should point at specific real-world objects using his or her hand that the user wants the device to recognize in the future to permit device use (or else deny device use if that specific object is not recognized). Gesture recognition using an outward-facing camera on the device may therefore be used to recognize the user as pointing with an index or other finger and to then map the gesture to a particular object in the camera's field of view to thus identify that object as one that should be identified for that particular location in order to permit device use at that location.

Figure 8:
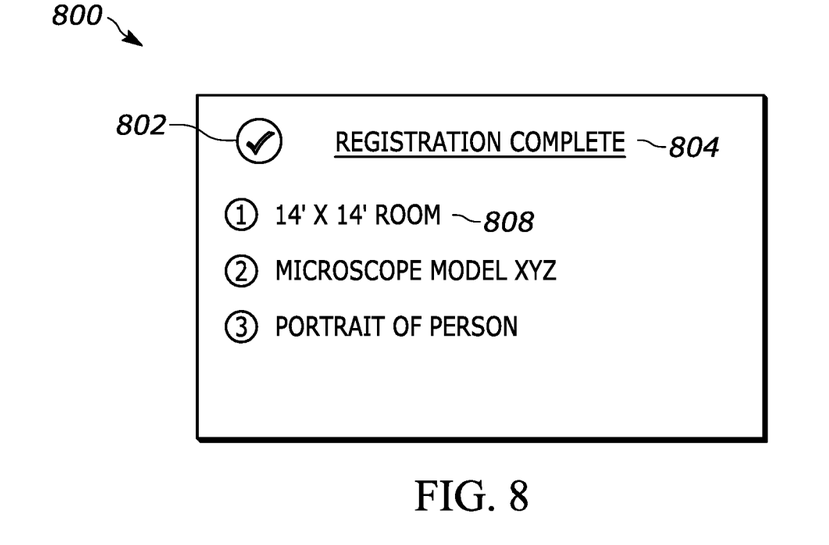

Once the user has turned in a circle and/or complied with any other instructions provided via the prompt 700, the prompt 800 shown in FIG. 8 may be presented on the display of the device. The prompt 800 may include a graphical object 802 and text 804 indicating that location registration has been completed. In some examples, the prompt 800 may even include a listing 808 of various aspects or elements of the area that were identified during the registration process, such as the dimensions of a room that establishes the location, a particular object that was recognized (e.g., down to make and model number), and a unique portrait or painting.

Figure 9:
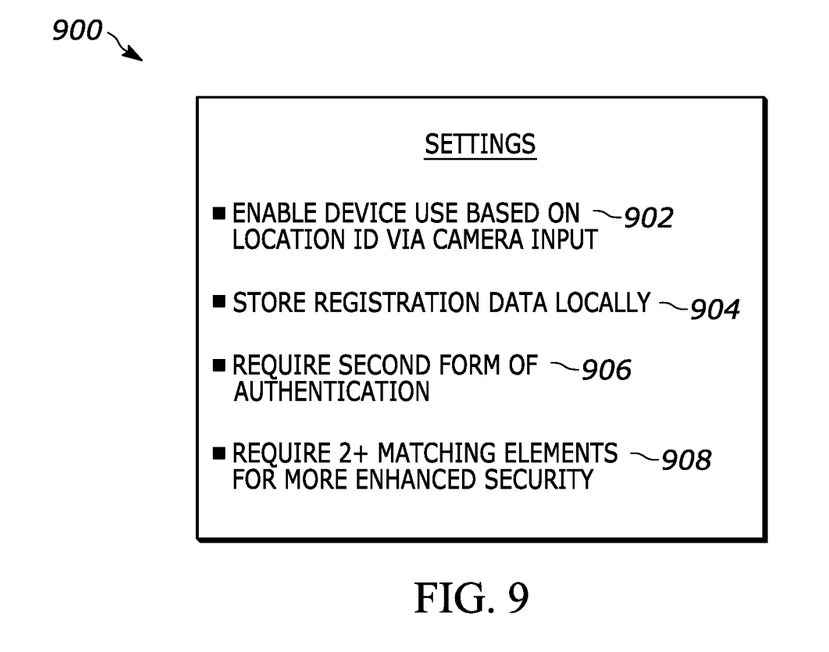
FIG. 9 shows an example graphical user interface (GUI) that may be presented on a display for a user to configure one or more settings of a device operating consistent with present principles.

Now in reference to FIG. 9, it shows an example graphical user interface (GUI) 900 that may be presented on the display of a device configured to undertake present principles, such as the display of an AR headset or smartphone programmed to undertake the logic of FIGS. 5 and 6 and to execute other functions as described herein. Additionally or alternatively, the GUI 900 may be presented on the display of another device in communication with an AR device, such as a laptop computer that wirelessly communicates with the AR headset to configure and control the headset.

In any case, the GUI 900 may be used to configure one or more settings of the AR device to operate as described herein. It is to be understood that each of the options to be discussed below may be selected by selecting the respectively adjacent check box using voice input, cursor input, touch input, eye input, etc.

Accordingly, as shown in FIG. 9 the GUI 900 may include a first option 902 that may be selectable to set or enable the device to, in the future, attempt to authenticate current device locations as being registered for device use based on input from a camera. For example, the option 902 may be selected to set or configure the device to execute the logic of FIGS. 5 and/or 6 and to undertake other functions as described herein.

The GUI 900 also shows an option 904 that may be selected to command the device to store registration data as described herein locally at the AR device itself so that, for example, the AR headset may authenticate a current location even if it does not have an Internet or other network connection to other devices to access registration data as stored remotely. This may be particularly useful in settings where a company may not permit network connections within a highly secure area in order to prevent hacking of any device within the secure location and/or to prevent interception of sensitive data while in transit between devices.

An option 906 may also be presented on the GUI 900. The option 906 may be selected to set or configure the device to require a second form of authentication in order to permit device use, such as user-specific authentication using biometric ID, password, or PIN to provide two-factor authentication so that both a registered user and a registered location are to be identified before AR device use is permitted for added security.

Still further, the GUI 900 may include an option 908 that may be selected to set or enable the device to, also for added security, require identification of two or more elements (e.g., individual objects or geographical dimensions) that match registration data in order to permit AR device use. In essence, this may increase the threshold level of confidence the device uses to authenticate a location since two elements or aspects of the location may need to be identified rather than one. This may be useful where, for example, the end-user takes a coffee mug with him or her to various locations and so the device identifying the coffee mug alone may not be sufficient for validating a given location.

It may now be appreciated that present principles provide for an improved computer-based user interface that improves the functionality, electronic security, and ease of use of the devices disclosed herein, including AR devices. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   a camera accessible to the at least one processor; and
   storage accessible to the at least one processor and comprising instructions executable by the at least one processor to:
   responsive to a trigger, receive input from the camera;
   based on the input, recognize one or more aspects related to a geographic location that have been preregistered, wherein the one or more aspects that are preregistered comprise one or more of: a registered object associated with the geographic location, geometry of the geographic location;
   based on the recognition of the one or more aspects related to the geographic location that have been pre-registered, permit use of the device; and
   based on failure to recognize the one or more aspects related to the geographic location that have been pre-registered, deny use of the device;
   wherein the instructions are executable to:
   prior to the trigger, receiving the input, and recognizing the one or more aspects, present a settings graphical user interface (GUI) on a display, the settings GUI comprising an option that is selectable to enable the device to, in the future, perform the recognition of the one or more aspects.

2. The device of claim 1, wherein the trigger comprises receipt of a power on signal, the power on signal generated responsive to a press of a power button on the device.

3. The device of claim 1, wherein the instructions are executable to:
   present a first GUI on the display, the first GUI comprising a prompt instructing a user to point at one or more real-world objects to register for subsequent recognition by the device to permit use of the device;
   execute gesture recognition to identify the user as pointing with a finger at the one or more real-world objects to register the one or more real-world objects; and
   subsequent to identification of the user as pointing with the finger at the one or more real-world objects to register the one or more real-world objects, present a second GUI on the display, the second GUI being different from the first GUI, the second GUI indicating that the one or more real-world objects have been registered, the first and second GUIs being different from the settings GUI.

4. The device of claim 1, wherein the instructions are executable to:
   present a first GUI on the display, the first GUI comprising a prompt instructing a user to turn in a circle for the device to map the geographic location and/or recognize individual objects to register for subsequent recognition by the device to permit use of the device, the first GUI being different from the settings GUI.

5. The device of claim 1, wherein the instructions are executable to:
   based on the recognition of the one or more aspects related to the geographic location, present a first graphical object on the display, the first graphical object indicating a first aspect of the geographic location that has been recognized; and
   based on identification, using the input from the camera, of a real-world object that has not been matched to a registered object, present a second graphical object on the display, the second graphical object being different from the first graphical object.

6. The device of claim 1, wherein the trigger comprises receipt of a power on signal.

7. A method, comprising:
   responsive to a trigger, receiving, at a device, input from a camera;
   based on the input, using the device to recognize one or more elements related to a particular location that have been preregistered;
   based on the recognition of the one or more elements related to the particular location that have been preregistered, permitting use of the device and presenting a first graphical object on a display, the first graphical object indicating a first element of the particular location that has been recognized;
   based on failure to recognize the one or more elements related to the particular location that have been preregistered, deny use of the device; and
   based on identification, using the input from the camera, of a real-world object that has not been matched to a registered object, presenting a second graphical object on the display, the second graphical object being different from the first graphical object.

8. The method of claim 7, wherein the trigger comprises receipt of a power on signal, the power on signal generated responsive to a press of a power button on the device.

9. The method of claim 7, comprising:
   as part of a registration process, presenting a first graphical user interface (GUI) on the display, the first GUI comprising a prompt instructing a user to point at one or more real-world objects to register for subsequent recognition by the device to permit use of the device;
   executing gesture recognition to identify the user as pointing with a finger at the one or more real-world objects to register the one or more real-world objects; and
   subsequent to identification of the user as pointing with the finger at the one or more real-world objects to register the one or more real-world objects, presenting a second GUI on the display, the second GUI being different from the first GUI, the second GUI indicating that the one or more real-world objects have been registered.

10. The method of claim 7, wherein the trigger comprises receipt of a power on signal.

11. The method of claim 7, comprising:
    presenting a graphical user interface (GUI) on the display, the GUI comprising a prompt instructing a user to turn in a circle for the device to map the particular location and/or recognize individual objects to register for subsequent recognition to permit use of the device.

12. The method of claim 7, comprising:
    presenting a settings graphical user interface (GUI) on the display, the settings GUI comprising an option that is selectable to enable the device to, in the future, perform the recognition of the one or more elements.

13. An apparatus, comprising:
at least one computer readable storage medium (CRSM) that is not a transitory signal, the computer readable storage medium comprising instructions executable by at least one processor to:
present a first graphical user interface (GUI) on a display, the first GUI comprising a prompt instructing a user to point at one or more real-world objects to register for subsequent recognition by the at least one processor to permit use of a device;
identify the user as pointing with a finger at the one or more real-world objects to register the one or more real-world objects;
subsequent to identification of the user as pointing with the finger at the one or more real-world objects to register the one or more real-world objects, present a second GUI on the display, the second GUI being different from the first GUI, the second GUI indicating that the one or more real-world objects have been registered;
receive input from a camera;
based on the input, recognize one or more aspects related to a particular location that have been preregistered, the one or more aspects comprising one or more of: geometry of the particular location, a registered object located at the particular location;
based on the recognition of the one or more aspects related to the particular location that have been preregistered, permit use of the device; and
based on failure to recognize the one or more aspects related to the particular location that have been preregistered, deny use of the device.

14. The apparatus of claim 13, wherein the instructions are executable to:
responsive to receipt of a power on signal, attempt to recognize the one or more aspects related to the particular location that have been preregistered.

15. The apparatus of claim 13, wherein the instructions are executable to:
present a graphical user interface (GUI) on the display, the GUI comprising a prompt instructing the user to turn in a circle for the device to map the particular location and/or recognize individual objects to register for subsequent recognition to permit use of the device.

16. The apparatus of claim 13, wherein the instructions are executable to:
based on the recognition of the one or more aspects related to the particular location, present a first graphical object on the display, the first graphical object indicating a first aspect of the particular location that has been recognized; and
based on identification, using the input from the camera, of a real-world object that has not been matched to a registered object, present a second graphical object on the display, the second graphical object being different from the first graphical object.

17. The apparatus of claim 13, wherein the instructions are executable to:
present a settings graphical user interface (GUI) on the display, the settings GUI comprising an option that is selectable to enable the at least one processor to, in the future, perform the recognition of the one or more aspects.

* * * * *